United States Patent Office 3,519,006
Patented July 7, 1970

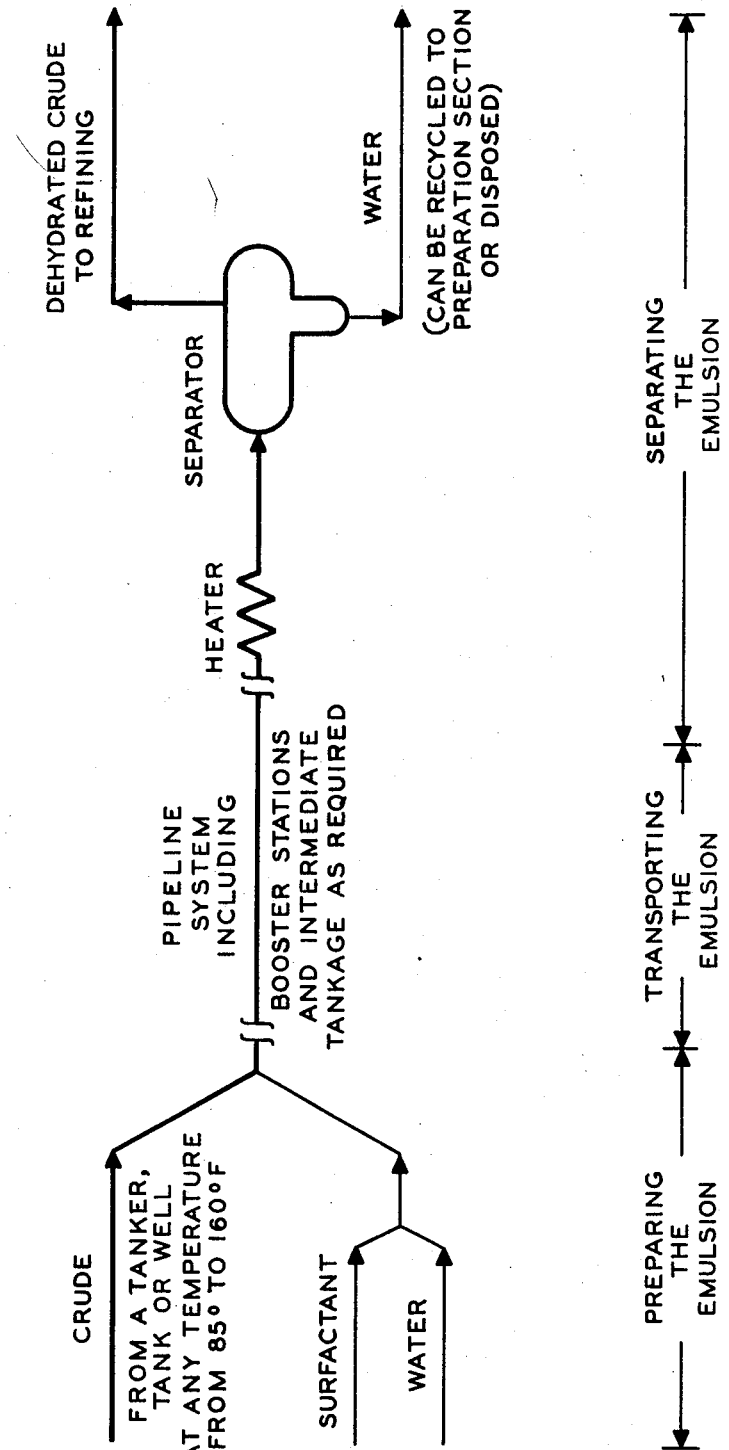

3,519,006
PIPELINING OIL/WATER MIXTURES
Ralph Simon, 8258 S. Calmada Ave. 90602, and Wesley G. Poynter, 11218 Tigrina St. 90603, both of Whittier, Calif.
Filed Dec. 5, 1966, Ser. No. 599,125
Int. Cl. F17d 1/16
U.S. Cl. 137—13     5 Claims

ABSTRACT OF THE DISCLOSURE

The disclosure provides for transporting viscous crude oil by utilizing a nonionic surfactant to form an oil and water emulsion of the crude, the water content of which is in the range of from 25 percent by volume to the smallest amount of water which will allow formation of a continuous water phase. This lower amount of water is usually in the 10 to 15 percent range.

---

This invention relates to a process for transporting viscous crude oils; and, more particularly, this invention relates to a process of transporting viscous crude oils through a pipeline by forming an easily broken, but transportably stable, low-viscosity, oil-in-water mixture.

It has been found heretofore that the viscosity of crude oils can be greatly reduced by forming an oil-in-water emulsion of the crude. In one process, for example, as disclosed in copending U.S. application Ser. No. 518,124, a stable oil-in-water emulsion is created by contacting a viscous crude with water and a base in the presence of an emulsifying agent for the crude. One problem associated with prior art methods, however, is the extreme stability of the oil-in-water emulsion and the resulting difficulty in breaking the oil and water into separate phases. Thus the emulsions formed in accordance with prior art teachings are so stable that it is difficult and expensive to break them at the pipeline terminal into a separate oil phase and a separate water phase. In addition, the emulsions formed by the process of the prior art are usually limited in oil content to about 70 to 75 percent. Thus the prior art emulsions usually contained about 25 to 30 percent water. Because of this relatively high water content, the amount of oil carried in the pipeline was necessarily reduced.

In accordance with the present invention, a method is provided for transporting a viscous crude in the form of an oil-in-water mixture which is a relatively stable oil-in-water emulsion during movement but which tends to separate into separate phases when immobile and which thus can easily be broken when desired. The mixture of the present invention is formed by adding to oil an aqueous solution containing a nonionic surfactant. The surfactant is selected for a particular crude to form a mixture which retains its advantageous properties during transport but which is easily broken at the pipeline terminal. The nonionic surfactant is added to the water in relatively small amounts. For example, the surfactant may be added to the water in a concentration of as little as about 0.04 percent to as much as about 10 percent or more based on the water content. The water containing the nonionic surfactant is mixed with the oil in a ratio of about 70 to 85–90 percent oil and about 30 to 15–10 percent water. The upper oil/water ratio is limited by the amount of water needed to produce an oil-in-water emulsion for pipeline transportation. This upper ratio for most surfactants and crude oils is between about 85 to 90 percent oil and 15 to 10 percent water. An oil-in-water mixture may also be formed at lower oil/water ratios. Thus any oil/water ratio less than the upper limit for the oil/water ratio may be utilized in accordance with the invention. Although it is usually desirable to have the oil-water ratio in excess of 70/30, there are occasions when need for lower oil/water ratios, such as 25/75, arise. The mixture thus formed is moved through a pipeline in the form of an emulsion to a receiving station. An emulsion formed in accordance with the present method is easily broken by heating the emulsion to a suitable temperature. Ordinarily a temperature in the range of from 200 to 250° F. is suitable to cause the emulsion to separate into a relatively dry oil phase and a water phase.

A principal object of the present invention is to provide a method of forming a transportable oil-in-water mixture for pipelining utilizing a nonionic surfactant in aqueous solution in which the mixture has relatively high oil-to-water ratio and which mixture is easily broken into a separate oil phase and water phase when desired.

Further objects of the present invention will become apparent from the following description read in light of the accompanying drawing which is made a part of this specification and which is a flow diagram illustrating the preferred embodiment of the invention.

The present invention provides a process for transporting a viscous crude oil through a pipeline from an oil source to a downstream receiving station. In order to transport the oil, it is first necessary to form a low-viscosity, transportable, oil-in-water mixture. The mixture is prepared in a manner so that a relatively stable emulsion is obtained while it is being moved but which tends to separate into the separate oil and water phases at ambient temperature when movement stops. The mixture, however, is such that movement may be easily reestablished after a shut down to again establish the oil and water emulsion to allow relatively low pressure drop transport of the low-viscosity emulsion. The emulsion is easily broken at the pipeline terminal by a simple heating technique.

The preferred method of the present invention will be briefly described in relation to FIG. 1 so that an overall understanding of the invention may be obtained before going into specific details of the method. The specific embodiment of FIG. 1 deals with Boscan crude oil.

FIG. 1 diagrammatically illustrates the preferred embodiment of the present invention. As there shown, a Boscan crude is taken from a tank, tanker or a well at any temperature between 85° to 160° F. and moved into a pipeline. An aqueous surfactant solution is formed and is added to the crude to make an oil-in-water mixture which forms an oil and water emulsion when agitated. Suitable ratios and types of surfactants are set out in Table II below. The mixture thus formed is transported through the pipeline system including any booster stations and intermediate tankage that may be required. At the pipeline terminal, the mixture is heated to a higher temperature of at least 200° F. and moved into a separator. Dehydrated crude is drawn off the top of the separator and water which can be recycled if desired is removed from the bottom.

PREPARING THE OIL-IN-WATER MIXTURE

In accordance with the present invention, an oil-in-water mixture is prepared by mixing a crude oil with a dilute aqueous surfactant solution. The upper oil limit of the mixture is determined by the minimum amount of water required to form a continuous water phase. For most oils, the upper limit is about 85 to 90 percent for pipeline stability. Thus with as little as about 10 to 15 percent water, a continuous water phase can be formed. It is critically important that the mixture form an oil-in-water emulsion when agitated and not a water-in-oil emulsion since the latter has very undesirable properties for use in the present invention.

An aqueous surfactant solution is added to the oil to form the desired mixture. As indicated, the amount of water may be as little as about 10 to 15 percent. The surfactant is added to the water before the water is mixed with the oil. Nonionic surfactants are used in the present invention. Nonionic surfactants useful in the present invention can be divided into five basic types by linkage. (See "Emulsion Theory and Practice," by P. Becher, ACS Monograph, No. 162, 1965, Reinhold Publishers, New York.) These five types are ether linkage, ester linkage, amide linkage, miscellaneous linkage and multiple linkage. The ether linkage, nonionic surfactants are preferred for use in the present invention. The surfactants preferred for use in the present invention are selected from the group having the general formulas:

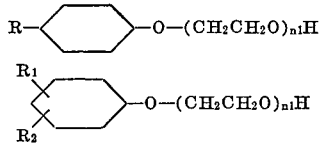

where R, $R_1$ and $R_2$ = any hydrocarbon group and $n_1$ and $n_2$ = 4 to 100.

As indicated above, other surfactants, such as the ester linkage and the amide linkage, may be used in accordance with the invention. The general formula for the ester linkage is:

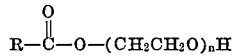

where R = a fatty acid group and $n$ = 4 to 100. The general formula for the amide linkage surfactant is:

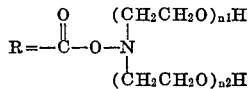

where R = any hydrocarbon group and $n_1$ and $n_2$ = 4 to 100.

The highly preferred nonionic surfactants for use in accordance with the invention are the nonylphenoxypoly-(ethyleneoxy) ethanols. Superior results have been obtained with surfactants containing 10–15 moles ethylene oxide per mole of nonylphenol. These surfactants have decreasing water solubility with increasing temperature. Emulsions formed with these types of surfactants have good stability up to 160° F. and fair stability in the 160–175° F. range. At temperatures in the 200° F. range, separator of oil and water is rapid, and gravity separation can produce a low water cut oil.

The highly preferred surfactants are selected from a group having the general formulas:

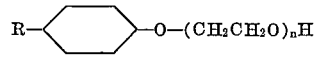

and

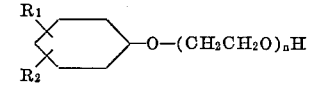

where R, $R_1$ and $R_2$ = any alkyl radical and where $n$ = 4 to 100.

A list of highly preferred surfactants is set out below:

TABLE I

| Proprietary name | R | $n$ |
|---|---|---|
| NIW | $C_{12}H_{25}$ | 14 |
| NIO | $C_{12}H_{25}$ | 6 |
| Igepal CO 430 | $C_9H_{19}$ | 4 |
| Igepal CO 530 | $C_9H_{19}$ | 6 |
| Igepal CA 630 | $C_8H_{17}$ | 9 |
| Igepal CO 710 | $C_9H_{19}$ | 10–11 |
| Igepal CO 730 | $C_9H_{19}$ | 15 |
| Igepal CO 850 | $C_9H_{19}$ | 20 |
| Igepal CO 887 | $C_9H_{19}$ | 30 |
| Igepal CO 990 | $C_9H_{19}$ | 100 |
| Igepal DM 710 | 2-4 dinonyl | 10–11 |
| Igepal DM 970 | 2-4 dinonyl | 50 |
| DME | Proprietary mixture, chemically similar to Igepal CO 887. | |

Suitable ester linkage surfactants, for example, include surfactants having the following general formulas:

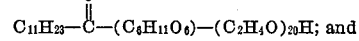

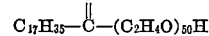

Table II sets out the results of a number of demon-

TABLE II

| Sample No. | Oil/water ratio | Chemical Name | Vol. percent in water | mixture viscosity °F. | mixture viscosity Cp. | Water remaining in oil separated at 200° F. percent |
|---|---|---|---|---|---|---|
| 1 | 75/25 | CO 710 | 0.10 | 117 | 93 | 11.7 |
| 2 | 75/25 | CO 710 | 0.10 | 112 | 78 | 2.0 |
| 3 | 75/25 | CA 630 | 0.10 | 116 | 55 | 10.8 |
| 4 | 75/25 | CA 630 | 0.10 | 108 | 67 | 2.0 |
| 5 | 75/25 | DM 970 | 0.10 | 121 | 60 | 12.5 |
| 6 | 75/25 | DM 970 | 0.10 | 108 | 69 | 2.4 |
| 7 | 75/25 | DME | 0.10 | 109 | 91 | 10.5 |
| 8 | 75/25 | DMEgg | 0.10 | 104 | 100 | 3.9 |
| 9 | 75/25 | NIW | 0.10 | 120 | 59 | |
| 10 | 75/25 | NIW | 0.10 | 122 | 56 | 10.6 |
| 11 | 75/25 | NIW | 0.10 | 116 | 46 | 2.1 |
| 12 | 80/20 | NIW | 0.10 | 127 | 49 | |
| 13 | 80/20 | NIW | 0.10 | 120 | 48 | 10.0 |
| 14 | 75/25 | NIW | 0.05 | 118 | 11 | |
| 15 | 75/25 | NIW | 0.05 | 120 | 43 | 10.3 |
| 16 | 80/20 | NIW | 0.05 | 123 | 26 | 11.0 |
| 17 | 85/15 | NIW | 0.05 | | | |
| 18 | 80/20 | CO 710 | 0.10 | 123 | 97 | 10.2 |
| 19 | 75/25 | CO 730 | 0.10 | 115 | 92 | 8.6 |
| 20 | 80/20 | CO 730 | 0.10 | 116 | 147 | 8.0 |
| 21 | 75/25 | CO 850 | 0.10 | 110 | 142 | 11.9 |
| 22 | 80/20 | CO 850 | 0.10 | 111 | 187 | 12.0 |
| 23 | 75/25 | CO 887 | 0.10 | 112 | 102 | 12.0 |
| 24 | 80/20 | CO 887 | 0.10 | 117 | 188 | 11.0 |
| 25 | 75/25 | CO 836 | 0.10 | 103 | 104 | 8.7 |
| 26 | 80/20 | CO 836 | 0.10 | 117 | 149 | 11.6 |
| 27 | 80/20 | CA 630 | 0.10 | 110 | 48 | 8.0 |
| 28 | 75/25 | DM 710 | 9.10 | 120 | 64 | 9.0 |
| 29 | 80/20 | DM 710 | 0.10 | 120 | 55 | 10.5 |
| 30 | 80/20 | DM 970 | 0.10 | 116 | 93 | 9.7 |
| 31 | 80/20 | DME | 0.10 | 114 | 159 | 11.0 |
| 32 | 75/25 | NIW | 0.15 | 116 | 68 | 11.0 |
| 33 | 75/25 | NIW | 0.20 | 117 | 72 | 15.0 |
| 34 | 75/25 | Visco-1111 | 0.20 | 114 | 45 | |
| 35 | 75/25 | Visco-1111 | 0.30 | 106 | 81 | |
| 36 | 75/25 | Visco-1111 / NIW | 0.05 / 0.05 | 108 | 45 | |
| 37 | 75/25 | Visco-1111 / CO 730 | 0.05 / 0.05 | 110 | 95 | |
| 38 | 75/25 | Visco-1111 / CO 850 | 0.05 / 0.05 | 114 | 89 | | strations showing various combinations of oil/water ratios, surfactants, and surfactant percentages useful in forming transportable emulsions in accordance with this invention. The results show that suitable mixtures may be formed with water containing .05 percent surfactant based on added water. It is usually preferred, however, to form the mixture with at least about .1 percent surfactant based on added water. The advantage that is obtained by forming the transportable mixture is readily seen in the case of Boscan crude. The viscosity of pure Boscan crude is 80,000 centipoises at 70° F. However, the viscosity of an emulsion containing 75 percent Boscan and 25 percent water is only 50 centipoises at 70° F. Table II shows properties of various mixtures of Boscan crude, water and surfactants.

The advantages of the method of the present invention have been demonstrated with a number of other crude oils. Table III sets out the properties of mixtures prepared with California crude oils utilizing fresh water and various surfactants. The California crude oils are namely indicated as A, B and C. The A crude has an API gravity of 12.17 and a viscosity of 14,000 centipoises at 70° F. The B crude has an API gravity of 12.17 and a viscosity of 19,000 centipoises at 70° F. The C crude has an API gravity of 10.15 and a viscosity of 70,000 centipoises at 70° F.

TABLE III

| Producing zone | Oil/water ratio | Chemical | Chemical concentration in water, volume percent | Emulsion viscosity Temperature, °F. | Viscosty, cp. |
| --- | --- | --- | --- | --- | --- |
| B | 75/25 | NIW | 0.10 | 98 | 20 |
| B | 75/25 | CO 850 | 0.10 | 99 | 75 |
| B | 75/25 | DM 710 | 0.10 | 97 | 24 |
| A | 75/25 | NIW | 0.10 | | |
| A | 75/25 | CO 850 | 0.10 | 117 | 17 |
| A | 75/25 | DM 710 | 0.10 | 98 | 20 |
| C | 75/25 | NIW | 0.10 | | |
| C | 75/25 | CO 850 | 0.10 | 100 | 25 |
| C | 75/25 | DM 710 | 0.10 | | |

In Table IV, the properties of mixtures prepared with the California crudes nominated A, B and C with aqueous solutions containing Igepal CO 850 are shown. As indicated in the table, the mixture is prepared with both fresh and produced waters. Suitable mixtures were formed with 0.04% surfactant.

TABLE IV

| Producing zone | Oil/water ratio | Water | Chemical concentration in water, volume percent | Emulsion viscosity Temperature, °F. | Viscosity cp. |
| --- | --- | --- | --- | --- | --- |
| B | 75/25 | Produced | 0.10 | 96 | 97 |
| C | 75/25 | do | 0.10 | | |
| A | 75/25 | do | 0.10 | 100 | 13 |
| A | 75/25 | Fresh | 0.10 | 110 | 19 |
| A | 75/25 | do | 0.08 | 100 | 15 |
| A | 75/25 | do | 0.06 | 84 | 35 |
| A | 75/25 | do | 0.04 | 100 | 12 |
| A | 75/25 | do | 0.02 | | |
| A | 75/25 | do | 0.01 | | |
| A | 75/25 | Produced | 0.10 | 94 | 14 |
| A | 75/25 | do | 0.08 | 93 | 9 |
| A | 75/25 | do | 0.04 | 97 | 11 |
| A | 75/25 | Fresh | 0.06 | 82 | 23 |

As is evident from the data presented in Tables II, III and IV, a tremendous improvement in viscosity can be obtained by forming transportable emulsions of the viscous crudes in accordance with the present invention.

As indicated above, the upper oil/water ratio is limited by the amount of water needed to produce a suitable oil-in-water emulsion for pipelining transportation. The upper limit for oil in most surfactant and crude oil mixtures is between about 85 to 90 percent. Thus the minimum amount of water that can be used in accordance with the present invention usually is between 10 and 15 percent. Table V below shows the effect of gradually decreasing the water content in the aqueous surfactant mixture. The crude oil used in Table V was a California crude type A oil maintained at 140° F. A 0.1 percent Igepal CO 850 in tap water at 72° F. formed the aqueous solution. It is apparent that oil-in-water emulsions were formed at the 75/25 to the 85/15 mixtures because the mixtures were water wet and had electrical conductivity.

TABLE V

| O/W | Water wet glass wall | Elect. conductivity | Dispersed in— Water | Toluene |
| --- | --- | --- | --- | --- |
| 75/25 | Yes | Yes | Yes | No. |
| 80/20 | Yes | Yes | Yes | No. |
| 85/15 | Yes | Yes | Slow | Slow. |
| 90/10 | No | No | V. slow | Slow. |
| 95/5 | No | No | do | Slow. |

Table VI below shows the effect of varying the oil/water ratio in mixtures of California crude oil D. The D crude was at a temperature of 110° F. and was mixed with an aqueous surfactant solution formed of 0.1 percent DM 970 at 72° F.

TABLE VI

| O/W | Water wet glass wall | Elect. conductivity | Dispersed in— Water | Toluene |
| --- | --- | --- | --- | --- |
| 75/25 | Yes | Yes | Yes | No. |
| 80/20 | Yes | Yes | Yes | No. |
| 85/15 | Yes | Yes | Yes | No. |
| 90/10 | Yes | Yes | Yes | No. |
| 95/5 | No | No | No | Yes. |

The data given in Tables V and VI indicate that the upper limit for oil in most aqueous solution, crude oil mixtures is between about 85 to 90 percent in order to form a suitable mixture for pipeline transportation. It is noted that relatively high oil/water mixtures in the range from 75/25 to 90/10 can be provided for transportation in accordance with the method of the present invention.

It has been found that the water with which the mixtures of the present invention are formed is not limited to distilled or potable water. The nonionic surfactants are not affected by salts in solution in the water; and, therefore, formation water, and even seawater, can be used in forming the mixtures in accordance with the present invention. This is a particularly desirable feature in field operations since it may not be economical to obtain large quantities of relatively fresh water for use in the process. Table VII sets out the properties of a Boscan crude, aqueous surfactant mixture when the water utilized was 100 percent seawater. Two emulsions were prepared with different surfactants and with seawater obtained directly from the ocean at Huntington Beach, Calif.

TABLE VII

| | A | B |
| --- | --- | --- |
| O./W. ratio | 75/25 | 75/25. |
| Oil temperature, °F | 140 | 95. |
| Seawater temperature, °F | 50 | 41. |
| Surfactant | CO 730 | Visco 1111. |
| Surfactant concentration in seawater, volume percent. | 0.1 | 0.1. |
| Dispersed in water | Yes | Yes. |
| Conducted electricity | Yes | Yes. |
| Emulsion viscosity | 183 cp. at 98° F | Under 200. |
| Separation after standing at 200° F. for one hour, volume percent water remaining in crude. | 3.8 | |

TRANSPORTING THE MIXTURE

After the mixture is prepared as described above, it can be transported in a conventional pipeline system. During movement, the mixture forms an emulsion which behaves as a stable, homogeneous fluid whose flowing pressure drop is related to the normal fluid dynamic parameters of viscosity, density, pipe diameter, pipe length and flow rate. Heating of the pipeline is not required.

In the event of an emergency shutdown, the oil-in-water mixture of the present invention will tend to separate into separate phases. However, the pipeline may be easily started up with no excessive start-up pressure and the emulsion reformed without difficulty. Oil-in-water mixtures formed in accordance with this invention have been allowed to stand in a pipeline for periods of up to 64 hours, and at the end of this time start-up was normal and no difficulties were encountered. Emulsion flow was reestablished, and unusual start-up pressures were not encountered.

Blocked operation of a pipeline utilizing an emulsion formed in accordance with the present invention interspaced by loads of normal low-viscosity oil will also present no problems. The emulsion formed in accordance with this invention wets the pipe wall with a film of water, and the emulsified crude does not stick to the pipe wall—therefore, no special displacement operation is required prior to utilizing the pipeline for a different oil.

SEPARATING THE OIL AND WATER

After the oil-in-water mixture has been transported in the form of an emulsion to its destination, separation can be accomplished simply by heating. For example, emulsions which can be prepared and which remain stable at 80° F. can be broken by heating to 200° F. and allowing the oil and water to separate. A Boscan crude and water mixture has been separated using this process so that less than three volume percent water remained in the crude.

The water which is separated from the oil is entirely suitable for reuse in the initial oil/water mixing step. If it is not desired to recycle the water, it can be disposed of by normal refinery waste water disposal methods.

It is apparent that modifications other than those described herein may be made to the method of this invention without departing from the inventive concept. It is intended that the invention embrace all equivalents within the scope of the appended claims.

We claim:

1. A method of transporting a viscous crude oil from a first location connected by a pipeline to a second location comprising contacting at a first location the viscous crude oil with water containing a nonionic surfactant selected from the group consisting of:

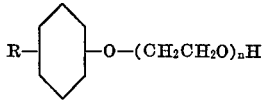

and

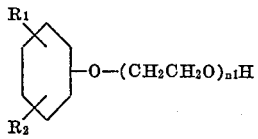

where R, $R_1$ and $R_2$ = any hydrocarbon group and $n$ and $n_1$ = 4 to 100, to form a mixture of oil and water which, when moved, forms an oil-in-water emulsion but which, when quiescent, tends to separate into separate phases, the amount of said water being not less than the smallest amount of water which will allow the formation of a continuous water phase, moving the said mixture to form an emulsion in a pipeline, transporting said emulsion through a pipeline to the second location and separating the oil and water at a second location.

2. The method of claim 1 further characterized in that the oil and water are separated by heated gravity separation at a temperature between about 200° and 250° F.

3. A method of transporting a viscous crude oil from a first location connected by a pipeline to a second location, comprising mixing in a pipeline a viscous crude oil with water containing at least about 0.5 percent of a nonionic surfactant having the general formula R—O—$(CH_2CH_2O)_n$H where R is an alkyl radical between $C_8H_{17}$ and $C_{12}H_{25}$ and $n$ equals the moles of ethylene oxide and is a number between 4 and 100 to form a mixture of oil and water which, when agitated, forms an oil-in-water emulsion but which, when quiescent, tends to separate into separate phases, the ratio of said crude oil to said water being in the range of from between 75/25 to a ratio containing the smallest amount of water which will allow the formation of a continuous water phase, moving the said mixture to form an emulsion in a pipeline, transporting said emulsion through a pipeline to the second location and separating the oil and water at the second location.

4. A method of transporting a viscous crude oil through a pipeline from a first location to a second location, comprising contacting at a first location a viscous crude oil with water containing a surfactant having the general formula:

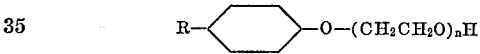

where R is an alkyl radical between $C_8H_{17}$ and $C_{12}H_{25}$ and $n$ equals the moles of ethylene oxide and is a number between 4 and 100, the ratio of said crude to said water being in the range from 75/25 to 85/15, mixing the crude and the water containing the surfactant to form an oil-in-water emulsion, moving the oil-in-water emulsion through a pipeline from said first location to said second location, breaking the emulsion at said second location and separating the crude oil from the water.

5. The method of claim 4 further characterized in that the emulsion-breaking step consists only of heating the emulsion to a temperature above 200° F.

References Cited

UNITED STATES PATENTS 1,970,578  8/1934  Schoeller.
2,213,477  9/1940  Steindorff.
3,006,354  10/1961  Sommer _____ 137—13

ALAN COHAN, Primary Examiner

PO-1050
(5/69)

UNITED STATES PATENT OFFICE
CERTIFICATE OF CORRECTION

Patent No. 3,519,006        Dated July 7, 1970

Inventor(s) Ralph Simon and Wesley G. Poynter

It is certified that error appears in the above-identified patent and that said Letters Patent are hereby corrected as shown below:

Col. 2, line 2 "oil-water" should read --oil/water--

Col. 2, line 14, "has relatively" should read --has a relatively--

Col. 3, line 20, "n1H" should read --n2H--

Col. 4, line 37, "$(C_2H_4O)4H$" should read --$(C_2H_4O)_4H$--

Col. 4, Table II, Col. 3, line 8, "DMEgg" should read --DME--

Col. 4, Table II, Col. 3, lines 25 and 26, "836" should read --436--

Col. 4, Table II, Col. 3, line 28, "9.10" should read --0.10--

SIGNED AND
SEALED
DEC 22 1970

(SEAL)
Attest:

Edward M. Fletcher, Jr.
Attesting Officer

WILLIAM E. SCHUYLER, JR.
Commissioner of Patents